(12) United States Patent
Hilberer

(10) Patent No.: US 8,580,013 B2
(45) Date of Patent: Nov. 12, 2013

(54) AIR DRYER CARTRIDGE AND METHOD FOR OPERATING AN AIR DRYER CARTRIDGE

(75) Inventor: Eduard Hilberer, Hockenheim (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 13/608,735

(22) Filed: Sep. 10, 2012

(65) Prior Publication Data

US 2013/0206003 A1  Aug. 15, 2013

Related U.S. Application Data

(63) Continuation of application No. PCT/EP2011/053140, filed on Mar. 3, 2011.

(30) Foreign Application Priority Data

Mar. 10, 2010  (DE) .......................... 10 2010 010 882

(51) Int. Cl.
*B01D 53/02* (2006.01)

(52) U.S. Cl.
USPC ................... 95/117; 95/121; 95/122; 96/143; 96/144; 96/147; 34/80; 34/472; 34/473; 34/DIG. 1; 55/DIG. 17; 137/414; 137/451; 137/799; 137/863

(58) Field of Classification Search
USPC .......... 55/DIG. 17; 95/117, 121, 122; 96/143, 96/144, 147; 137/414, 451, 799, 863; 34/80, 472, 473, DIG. 1
See application file for complete search history.

(56) References Cited

U.S. PATENT DOCUMENTS

| | | | | |
|---|---|---|---|---|
| 6,089,262 A | | 7/2000 | Hart | |
| 6,471,755 B2 * | | 10/2002 | Binder et al. | 96/147 |
| 6,568,100 B1 * | | 5/2003 | Fielding et al. | 34/80 |
| 8,021,465 B2 * | | 9/2011 | Hilberer | 95/117 |

FOREIGN PATENT DOCUMENTS

| | | |
|---|---|---|
| DE | 10 2005 039 059 B3 | 9/2006 |
| DE | 10 2007 046 167 A1 | 4/2009 |
| WO | WO 2004/103509 A2 | 12/2004 |
| WO | WO 2009/043427 A1 | 4/2009 |

OTHER PUBLICATIONS

Corresponding International Search Report with English Translation dated Sep. 19, 2011 (four (4) pages).
German Office Action with English Translation dated Oct. 19, 2010 (eight (8) pages).

(Continued)

Primary Examiner — Christopher P Jones
(74) *Attorney, Agent, or Firm* — Crowell & Moring LLP

(57) ABSTRACT

An air dryer cartridge is provided for a compressed air supply system, in particular a compressed air supply system of a commercial vehicle, with a drying agent box which is filled with a drying agent. The drying agent box can be coupled in an axial direction to a connecting flange of the compressed air supply system. A seal, which is designed as a non-return valve and, in the fitted state of the air dryer cartridge, acts in a sealing manner between the drying agent box and the connecting flange, is arranged on the drying agent box. A method for operating the air dryer cartridge on the compressed air supply system is also provided.

10 Claims, 4 Drawing Sheets

(56) References Cited

OTHER PUBLICATIONS

Notification of Transmittal of Translation of the International Preliminary Report on Patentability (PCT/IB/338) and International Preliminary Report on Patentability (PCT/IB/373), including Written Opinion (PCT/ISA/237) dated Oct. 11, 2012 (six (6) pages).
European Office Action dated Sep. 13, 2013 (5 pages).

* cited by examiner

AIR DRYER CARTRIDGE AND METHOD FOR OPERATING AN AIR DRYER CARTRIDGE

CROSS-REFERENCE TO RELATED APPLICATIONS

This application is a continuation of PCT International Application No. PCT/EP2011/053140, filed Mar. 3, 2011, which claims priority under 35 U.S.C. §119 from German Patent Application No. DE 10 2010 010882.0, filed Mar. 10, 2010, the entire disclosures of which are herein expressly incorporated by reference.

BACKGROUND AND SUMMARY OF THE INVENTION

The invention relates to an air dryer cartridge for a compressed air supply system, in particular a compressed air supply system of a commercial vehicle, with a desiccant box filled with a desiccant. The desiccant box is couplable in an axial direction to a connecting flange of the compressed air supply system, there being arranged on the desiccant box a seal which is designed as a non-return valve and which, when the air dryer cartridge is in the mounted state, exerts a sealing-off action between the desiccant box and the connecting flange.

The invention relates, furthermore, to a method for operating an air dryer cartridge on a compressed air supply system, in particular a compressed air supply system of a commercial vehicle.

Air dryer cartridges are required in the context of the provision or treatment of compressed air for compressed air supply systems, EAC in brief, particularly in the commercial vehicle sector. There, they are employed for clearing oil and dirt particles from generated compressed air and for drying the compressed air. Air dryer cartridges wear out and thus require periodic replacement.

In order to increase the durability of the air dryer cartridge used, compressed air supply systems according to the prior art have the possibility of regenerating the air dryer cartridge by the controlled backflow of already treated compressed air, moisture and other impurities collected in the air dryer cartridge being flushed out during such a regeneration phase.

FIG. 2 shows a perspective sectional view of a corresponding compressed air supply system according to the prior art. The compressed air supply system 10 illustrated includes a valve housing 12 and an air dryer cartridge 14. The air dryer cartridge 14, or a housing 28 of the air dryer cartridge 14, is connected directly to the valve housing 12 via a seal 30. The sealing-off force acting upon the seal 30 is made available by a bayonet ring 32. A desiccant box 26 is arranged inside the housing 28 of the air dryer cartridge 14.

When the compressed air supply system 10 is being used, compressed air flows through an inlet 34 of the valve housing 12 into the latter. The compressed air is conducted through a prefilter 36 in order subsequently, in an interspace between the outside of the desiccant box 26 and the inside of the housing 28, to flow into a free space 38 above the desiccant box 26. A multiplicity of orifices 40 are provided in the top side of the desiccant box 26 and connect the free space 38 above the desiccant box 26 to the interior of the latter. In particular, the compressed air flows out of the free space 38 via the orifices 40 and a first labyrinth region 42 of the desiccant box 26 into the lower region of the latter where the air is then deflected in order to flow into a second labyrinth region 44. The compressed air, conducted upward there, is deflected once again in the upper region, in order then to flow through a central labyrinth region 46 downward again in the direction of the valve housing 12. The dried compressed air is thus available in the air ducts of the valve housing 12 so that it can be delivered from there to the compressed air consumers.

For the purpose of drying the compressed air, the desiccant box 26 is filled with a granulate acting as a desiccant. The prefilter 36 serves for clearing coarser impurities from the compressed air.

A further filter device, which is not illustrated in FIG. 2, follows the prefilter 36 in the direction of flow of the compressed air, in order then also to free the compressed air of further impurities, in particular of oil and the like. The oil accumulates in the region of the air dryer cartridge 14 in a collecting conduit, not illustrated in FIG. 2. Under suitable pressure conditions in the compressed air supply system 10, the oil can flow from there via a flushing conduit 48 and a non-return valve 22 into the valve housing 12 and from there out to a discharge. The non-return valve 22 may be designed as a diaphragm valve, in which case the diaphragm should be manufactured from a material which withstands for a long period of time the chemical loads exerted by the foreign substances to be repelled.

FIG. 3 shows, for example, a diagrammatic illustration of an interface between an air dryer cartridge 14 and a valve housing 12 of a compressed air supply system 10 taken from the prior art. The arrangement of the components involved in cleaning the compressed air and in expelling the foreign particles is illustrated diagrammatically here. The compressed air 50 first flows through the prefilter 36 in order then subsequently to flow through the filer device 16. The filter device 16 is preferably designed as a coalescence filter, the foreign particles separated by the coalescence filter 16 accumulating in a collecting conduit 24 downstream of the coalescence filter 16 in the direction of flow. In this case, the entire region located upstream of the filter device 16 in the direction of flow of the compressed air is designated as a prefilter region 18, while the region downstream of the filter device 16 is designated as a postfilter region 20.

Provided in the valve housing 12 is a flushing conduit 48, which is connected to the collecting conduit 24 via a seal. The end of the flushing conduit 48 is sealed off by way of a non-return valve 22. The latter closes the flushing conduit 48 during the compressed air delivery phase during which the pressure in the prefilter region 18 usually exceeds the pressure in the postfilter region 20. If, however, a discharge valve is opened, thus leading to a pressure drop in the prefilter region 18, the pressure in the postfilter region 20 exceeds the pressure in the prefilter region 18. The non-return valve 22 consequently opens, with the result that the foreign particles which have accumulated in the collecting conduit 24 are expelled via the non-return valve 22.

The flushing conduit 48 may be arranged completely in the valve housing, the flushing conduit 48 adjoining the collecting conduit 24 via a seal 52. It is essential in this case that a pressure-tight connection between the collecting conduit 24 and the valve housing is made available, so that, under corresponding pressure conditions, the described expulsion of foreign particles can take place.

The non-return valve 22 is arranged at a markedly lower level than the collecting conduit 24. This even enables an inclination of the compressed air supply device to occur, without complete emptying of the collecting conduit 24 thereby being ruled out. In particular, tilts of the vehicle of up to 15 degrees still do not obstruct the complete emptying of the collecting conduit 24.

The air dryer cartridge illustrated in FIGS. 2 and 3 is manufactured without a base plate fixing the desiccant box in the housing, so as to make it easier to recycle the air dryer cartridge, since, in particular, its housing can be reused directly. As a direct consequence of this set-up, the non-return valve necessary for regeneration has been displaced out of the air dryer cartridge into the interior of the valve housing. The disadvantage of this version in structural terms however, is that the non-return valve is no longer exchanged together with the air dryer cartridge and, because of permanent contact with dirt and oil particles, has to be designed to be correspondingly robust so as to achieve the service life of the other components arranged in the valve housing of the compressed air supply system.

WO 2009/043427 A1 and DE 10 2005 039 059 B3 describe air filter cartridges with a base plate, wherein seals, designed as a non-return valve, are arranged in the interior of the air filter cartridge.

Furthermore, DE 10 2007 046 167 A1 discloses an air filter cartridge in which a seal acting as a non-return valve seals off between a desiccant box of the air filter cartridge and a connecting flange of the valve housing.

The object on which the present invention is based is, accordingly, to reduce the manufacturing outlay for producing a compressed air supply system, while at the same time ensuring improved operating reliability of this compressed air supply system.

This and other objects are achieved by an air dryer cartridge for a compressed air supply system, in particular a compressed air supply system of a commercial vehicle, with a desiccant box filled with a desiccant, the desiccant box being couplable in an axial direction to a connecting flange of the compressed air supply system, there being arranged on the desiccant box a seal which is designed as a non-return valve and which, when the air dryer cartridge is in the mounted state, exerts a sealing-off action between the desiccant box and the connecting flange. The seal has a U-shaped cross-sectional profile with a flexible lip.

The present invention builds on the generic air dryer cartridge in that the seal has a U-shaped cross-sectional profile with a flexible lip. The non-return valve necessary for regeneration can thus be exchanged together with the air dryer cartridge. In this case, it proves to be of particular advantage that the non-return valve can be designed as a simple seal, while at the same time the air dryer cartridge manages, as before, without a limiting base plate, in order to enable the housing receiving the desiccant box to be reused.

There may also be provision whereby the flexible lip of the seal is movable in a radial direction perpendicular to the axial direction, in order to provide functionality as a non-return valve.

Advantageously, the seal may define a plane perpendicularly to the axial direction, whereby a region serving as an oil sump is arranged in this plane so as to be spaced apart radially from the seal. By virtue of this design, outside a regeneration phase, the non-return valve is not loaded with the dirt particles which have been deposited in the meantime in the oil sump.

Furthermore, the oil sump may be arranged in the region of the connecting flange of the compressed air supply system, whereby the oil sump is covered, in the mounted state, by the air dryer cartridge. Thus, when the air dryer cartridge is being changed, it becomes possible to have simple access to the oil sump which can be cleaned correspondingly simply, for example simply by being wiped out.

The invention includes, furthermore, a method for operating an air dryer cartridge on a compressed air supply system, in particular a compressed air supply system of a commercial vehicle, in which, during a delivery phase of the compressed air supply system, a seal which is arranged on a desiccant box and which has a U-shaped cross-sectional profile with a flexible lip exerts a sealing-off action between the desiccant box and a connecting flange of the compressed air supply system, and, during a flushing phase of the compressed air supply system, the seal arranged on the desiccant box allows a controlled escape of air between the connecting flange and the desiccant box. The advantages and particular features of the air dryer cartridge according to the invention are thus also implemented in the context of a method.

This also applies to the below-described especially preferred embodiments of the method according to the invention.

The latter is expediently developed in that the seal allows the controlled escape of air in a radial direction perpendicular to an axial direction in which the air dryer cartridge is couplable to the compressed air supply system. The escape of air is in this case understood to mean exhaust or overflow from one region to another region via the seal.

There may also expediently be provision whereby, during the mounting of the air dryer cartridge, an oil sump arranged in the region of the connecting flange is covered by the air dryer cartridge.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the drawings, the same reference symbols designate identical or comparable components.

Figure 1:
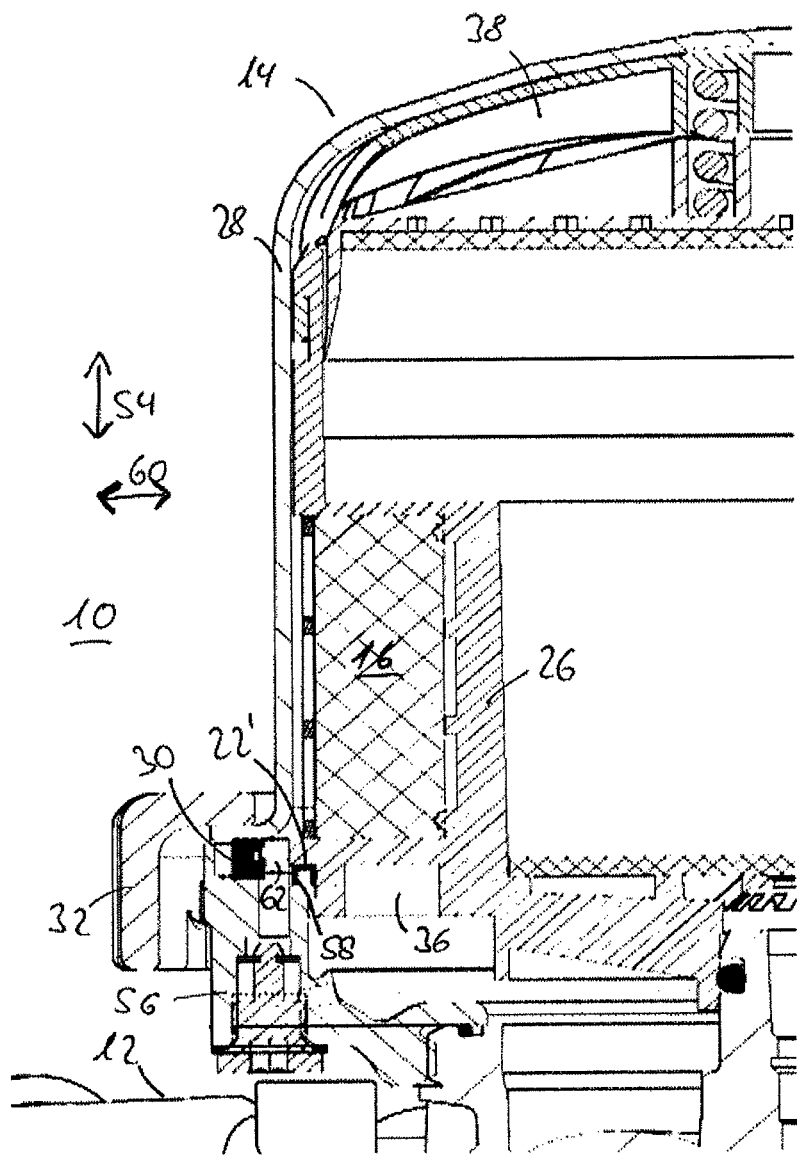
FIG. 1 is a sectional view of an air dryer cartridge according to an embodiment of the invention.

FIG. 1 shows a sectional view of an air dryer cartridge according to an exemplary embodiment of the invention. On account of the essentially rotationally symmetrical set-up of the air dryer cartridge, only the left half of the cartridge is illustrated. In contrast to the air dryer cartridge already known from FIG. 2, the air dryer cartridge 14 illustrated in FIG. 1, which is mounted on a valve housing 12 of a compressed air supply system 10, has a seal 22' which is designed as a non-return valve. For this purpose, the seal 22' is implemented with a U-shaped profile and has a flexible lip 58 which is movable in a radial direction 60 perpendicular to an axial direction 54 in which the air dryer cartridge 14 can be mounted on a connecting flange 56 of the valve housing 12 of the compressed air supply system 10. During a compressed air delivery phase, untreated compressed air flows via the prefilter 36 through the filter device 16 into the air dryer cartridge 14, as already described in connection with FIG. 2. The pressure drop in this case occurring presses the U-shaped profile of the seal 22' in the radial direction 60 against the connecting flange 56, so that the non-return valve implemented by the seal 22' between the desiccant box 26 and the connecting flange 56 is closed. The oil and dirt particles separated in the filter device 16 sink downward under the influence of gravity on the side of the filter device 16 which faces the housing 28 and collect in the region of an oil sump 62 which is arranged in the plane of the seal 22' between the seal 30 and the seal 22'.

During a regeneration phase, the flow conditions inside the air dryer cartridge 14 are reversed, and already treated compressed air flows rearward through the filter device 16 and is exhausted from the valve housing 12 via an outlet, not illustrated, oil and dirt particles present in the filter device 16 being entrained. This reversal of the air flows at the same time has the effect that the flexible lip 58 of the seal 22' is no longer pressed in the radial direction 60 against the connecting flange 56, so that the seal 22' designed as a non-return valve opens and the oil and dirt particles deposited in the oil sump 62 can, by bypassing the filter device 16, likewise be fed to the outflowing airstream.

If the air dryer cartridge 14 is lifted off from the connecting flange 56 in the axial direction 54 after the removal of the bayonet ring 32, there can be direct access in the axial direction 54 to the oil sump 62, for example in order to clean this manually.

The seal 22' is fastened to the desiccant box 26, for example simply by being snapped on. In the air dryer cartridge 14 illustrated, the desiccant box 26 can be extracted, together with the seal 22' fastened to it, from the housing 28 which can be reused directly.

Figure 2:
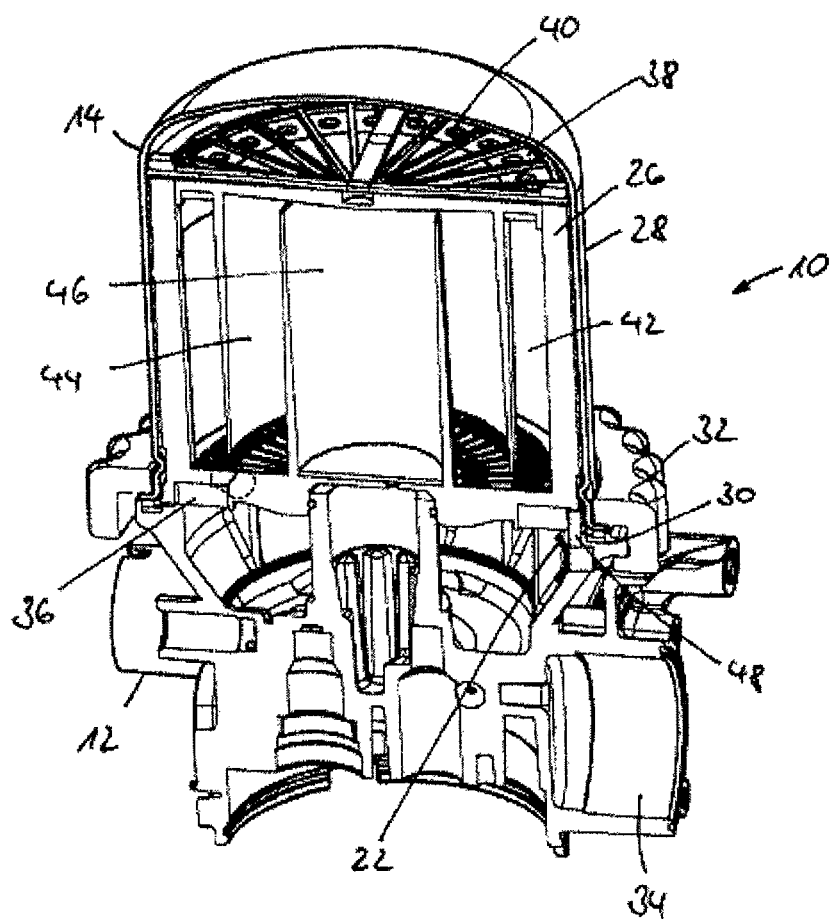
FIG. 2 is a perspective sectional view of a compressed air supply device with an air dryer cartridge according to the prior art.
Figure 3:
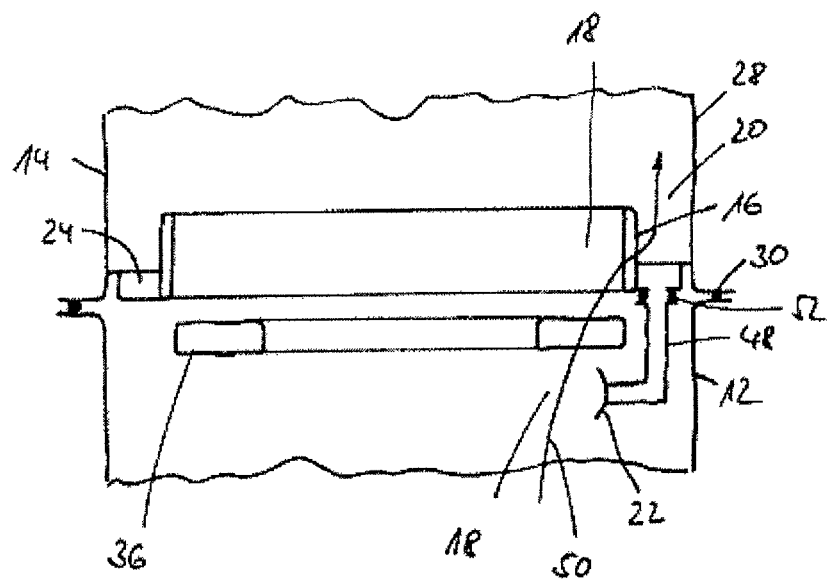
FIG. 3 is a diagrammatic illustration of the interface between an air dryer cartridge and a valve housing of a compressed air supply system according to the prior art.

FIGS. 2 and 3 have already been described in the introduction.

Figure 4:
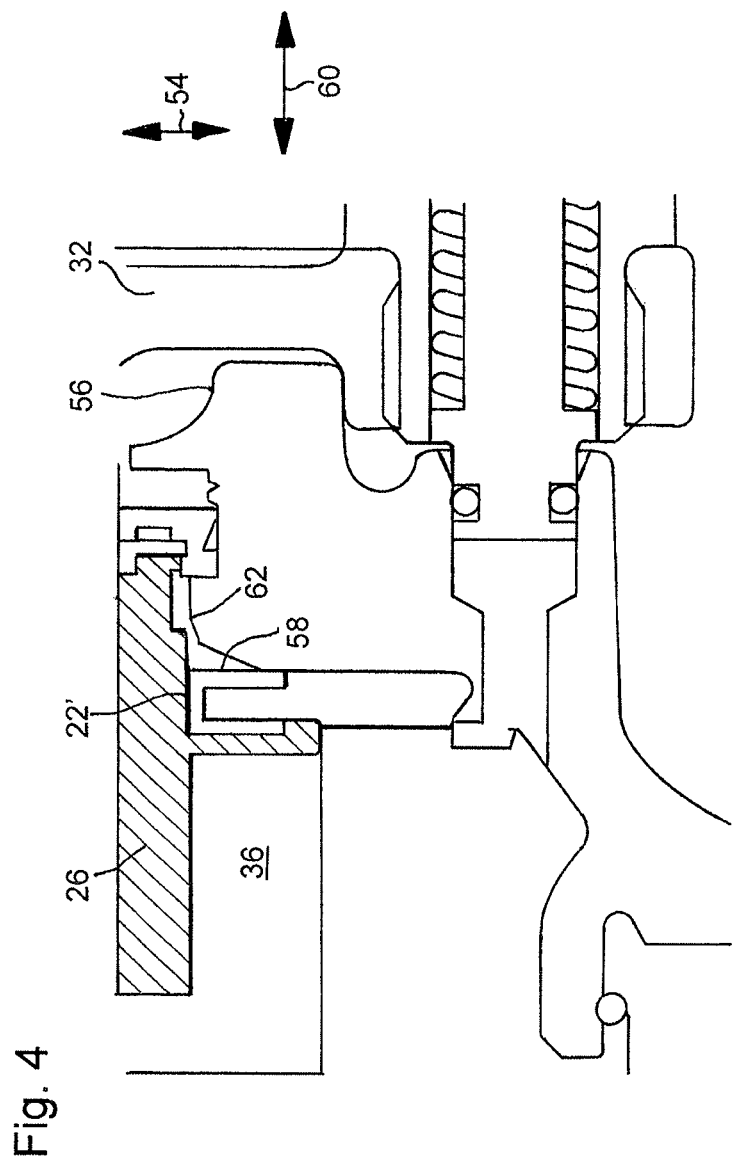
FIG. 4 is, in the form of a detail, an enlargement of a sectional view of an air dryer cartridge according to an embodiment of the invention.

FIG. 4 shows, in the form of a detail, an enlargement of an air dryer cartridge according to an embodiment of the invention. That region of the connecting flange 56 which includes the oil sump 62 is illustrated, enlarged, in FIG. 4. As in FIG. 1, only one side of the connecting flange 56 constructed essentially rotationally symmetrically with respect to the axial direction 54 is illustrated. During a compressed air delivery phase, on account of the prevailing pressure conditions, the flexible lip 58 of the seal 22' is pressed in the radial direction 60 outward, that is to say to the right against the connecting flange 56 with respect to FIG. 4. The seal 22' thus seals between the desiccant box 26 and the connecting flange 56. During a regeneration phase, the pressure conditions change, so that the flexible lip 58 is pressed in the radial direction 60 inward, which with respect to FIG. 4 corresponds to a deflection of the flexible lip 58 to the left, so that compressed air can be exhausted in a controlled way between the desiccant box and the connecting flange 56, oil and dirt particles deposited in the oil sump 62 being entrained.

LIST OF REFERENCE SYMBOLS

10 Compressed air supply system
12 Valve housing
14 Air dryer cartridge
16 Filter device
18 Prefilter region
20 Postfilter region
22 Non-return valve
22' Seal
24 Collecting conduit
26 Desiccant box
28 Housing
30 Seal
32 Bayonet ring
34 Inlet
36 Prefilter
38 Free space
40 Orifices
42 First labyrinth region
44 Second labyrinth region
46 Central labyrinth region
48 Flushing conduit
50 Compressed air
52 Seal
54 Axial direction
56 Connecting flange
58 Flexible lip
60 Radial direction
62 Oil sump The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air dryer cartridge for a compressed air supply system of a vehicle, comprising:
    a desiccant box filled with a desiccant, the desiccant box being coupleable in an axial direction to a connecting flange of the compressed air supply system;
    a seal arranged on the desiccant box, the seal being operatively configured as a non-return valve which, when the air dryer cartridge is in a mounted state, exerts a sealing-off action between the desiccant box and the connecting flange; and
    wherein the seal has a U-shaped cross-sectional profile, at least one leg of which provides a flexible lip.

2. The air dryer cartridge according to claim 1, wherein the flexible lip of the seal is movable in a radial direction perpendicular to an axial direction in order to provide the non-return valve functionality.

3. The air dryer cartridge according to claim 2, wherein the seal defines a plane perpendicular to an axial direction, a region serving as an oil sump being arranged in the plane spaced radially apart from the seal.

4. The air dryer cartridge according to claim 1, wherein the seal defines a plane perpendicular to an axial direction, a region serving as an oil sump being arranged in the plane spaced radially apart from the seal.

5. The air dryer cartridge according to claim 4, wherein the oil sump is arranged in the region of the connecting flange of the compressed air supply system, and further wherein the oil sump is covered in the mounted state by the air dryer cartridge.

6. The air dryer cartridge according to claim 1, wherein the air dryer cartridge is for the compressed air supply system of a commercial vehicle.

7. A method of operating an air dryer cartridge on a compressed air supply system of a vehicle, the method comprising the acts of:
    during a delivery phase of the compressed air supply system, sealing-off a desiccant box of the air dryer cartridge and a connecting flange of the compressed air supply system via a seal arranged on the desiccant box, the seal having a U-shaped cross-sectional profile with a flexible lip; and
    during a flushing phase of the compressed air supply system, allowing a controlled escape of air between the connecting flange and the desiccant box via the seal arranged on the desiccant box.

8. The method according to claim 7, wherein the seal allows the controlled escape of air in a radial direction perpendicular to an axial direction in which the air dryer cartridge is coupleable to the compressed air supply system.

9. The method according to claim 8, wherein, during mounting of the air dryer cartridge, an oil sump arranged in a region of the connecting flange is covered by the air dryer cartridge.

10. The method according to claim 7, wherein, during mounting of the air dryer cartridge, an oil sump arranged in a region of the connecting flange is covered by the air dryer cartridge.

* * * * *